US010133583B2

(12) United States Patent
Takahashi et al.

(10) Patent No.: US 10,133,583 B2
(45) Date of Patent: Nov. 20, 2018

(54) ELECTRONIC DEVICE, METHOD FOR CONTROLLING ELECTRONIC DEVICE, AND PROGRAM

(71) Applicant: Sony Corporation, Minato-ku (JP)

(72) Inventors: Tetsuya Takahashi, Nagano (JP); Takeshi Masuda, Nagano (JP)

(73) Assignee: Sony Corporation, Tokyo (JP)

( * ) Notice: Subject to any disclaimer, the term of this patent is extended or adjusted under 35 U.S.C. 154(b) by 23 days.

(21) Appl. No.: 14/293,507

(22) Filed: Jun. 2, 2014

(65) Prior Publication Data

US 2014/0380032 A1 Dec. 25, 2014

(30) Foreign Application Priority Data

Jun. 25, 2013 (JP) .................... 2013-132672

(51) Int. Cl.
  G06F 9/00 (2006.01)
  G06F 15/177 (2006.01)
  G06F 9/4401 (2018.01)
  G06F 1/26 (2006.01)
  G06F 1/32 (2006.01)

(52) U.S. Cl.
  CPC ............ G06F 9/4401 (2013.01); G06F 1/26 (2013.01); G06F 1/3234 (2013.01); G06F 1/3265 (2013.01); Y02D 10/153 (2018.01)

(58) Field of Classification Search
  CPC ...................................................... G06F 9/44
  See application file for complete search history.

(56) References Cited

U.S. PATENT DOCUMENTS

| 7,546,548 B2* | 6/2009 | Chew .................... G06F 3/0482 |
| | | 715/810 |
| 9,106,820 B1* | 8/2015 | Hammendorp ........ H04N 5/232 |
| 2003/0154008 A1* | 8/2003 | Nakamura ........... G01R 31/007 |
| | | 701/33.6 |
| 2005/0251697 A1* | 11/2005 | Narukawa ............. G06F 3/0238 |
| | | 713/310 |
| 2007/0107980 A1* | 5/2007 | Fujita .................... G03B 17/38 |
| | | 181/141 |
| 2008/0136906 A1 | 6/2008 | Park et al. |
| 2009/0094386 A1 | 4/2009 | Wang et al. |

(Continued)

FOREIGN PATENT DOCUMENTS

| JP | 2002-367353 | 12/2002 |
| JP | 2004-30144 | 1/2004 |

(Continued)

OTHER PUBLICATIONS

Partial European Search Report dated Nov. 4, 2015 in Patent Application No. 14171927.8.

(Continued)

Primary Examiner — Mohammed Rehman
(74) Attorney, Agent, or Firm — Xsensus, LLP

(57) ABSTRACT

There is provided an electronic device including a manipulation unit configured to acquire manipulation by a user, and a control unit configured to selectively execute one of a plurality of controls of the electronic device which are associated with a duration of the manipulation and to perform switching of at least one of the plurality of controls according to information indicating a state of the electronic device.

17 Claims, 13 Drawing Sheets

(56) References Cited

U.S. PATENT DOCUMENTS

| | | | |
|---|---|---|---|
| 2009/0227839 A1* | 9/2009 | Shimada | A61B 1/00055 600/118 |
| 2010/0293361 A1 | 11/2010 | Shibata | |
| 2010/0321173 A1* | 12/2010 | Magner | G07C 9/00182 340/426.1 |
| 2012/0079300 A1* | 3/2012 | Hachisuga | H04N 5/23241 713/320 |
| 2012/0133832 A1 | 5/2012 | Park et al. | |
| 2012/0272230 A1 | 10/2012 | Lee | |
| 2012/0278601 A1* | 11/2012 | Chang | G06F 1/3203 713/2 |
| 2013/0194897 A1* | 8/2013 | Kato | G04B 99/00 368/66 |
| 2014/0160007 A1* | 6/2014 | Lee | G06F 1/3218 345/156 |

FOREIGN PATENT DOCUMENTS

| | | |
|---|---|---|
| JP | 2014-517375 | 7/2014 |
| JP | 2014-160404 | 9/2014 |
| WO | WO 2012/158270 A1 | 11/2012 |

OTHER PUBLICATIONS

Extended European Search Report dated Feb. 23, 2016 in Patent Application No. 14171927.8.
Office Action issued in Japanese Patent Application No. 2013-132672, dated Nov. 22, 2016. With English translation. (11 pages).
Office Action dated May 18, 2018 for European Application No. 14171927.8.
Chinese Office Action dated Jun. 26, 2018 for Chinese Application No. 201410257873.0 (with English translation).

* cited by examiner

ELECTRONIC DEVICE, METHOD FOR CONTROLLING ELECTRONIC DEVICE, AND PROGRAM

CROSS REFERENCE TO RELATED APPLICATIONS

This application claims the benefit of Japanese Priority Patent Application JP 2013-132672 filed Jun. 25, 2013, the entire contents of which are incorporated herein by reference.

BACKGROUND

The present disclosure relates to an electronic device, a method for controlling an electronic device, and a program.

A technology is known by which an operation of an electronic device is implemented depending on how a handler such as a button is pressed. For example, JP 2000-20205A discloses a technology for a personal computer having an application function of taking an image. Specifically, a window for the application appears in front of windows of the other applications when a shutter button is halfway pressed, and taking an image is executed when the shutter button is fully pressed.

SUMMARY

However, the state of the electronic device is ever-changing due to a user's manipulation, progress of processing, or the like, and, for example, some component might not function properly. In such a case, the technology as described, for example, in JP 2000-20205A is not sufficient to implement optimum operation according to the user's manipulation.

In light of the foregoing, it is desirable to provide an electronic device, a method for controlling an electronic device, and a program which are novel and improved, and which can implement a more appropriate operation for a user's manipulation by reflecting the state of the electronic device on the operation.

According to an embodiment of the present disclosure, there is provided an electronic device including a manipulation unit configured to acquire manipulation by a user, and a control unit configured to selectively execute one of a plurality of controls of the electronic device which are associated with a duration of the manipulation and to perform switching of at least one of the plurality of controls according to information indicating a state of the electronic device.

According to an embodiment of the present disclosure, there is provided a method for controlling an electronic device, the method including acquiring manipulation by a user, and selectively executing one of a plurality of controls of the electronic device which are associated with a duration of the manipulation and performing switching of at least one of the plurality of controls according to information indicating a state of the electronic device.

According to an embodiment of the present disclosure, there is provided a program causing a controller or a processor of an electronic device to implement a function of acquiring manipulation by a user, and a function of selectively executing one of a plurality of controls of the electronic device which are associated with a duration of the manipulation and performing switching of at least one of the plurality of controls according to information indicating a state of the electronic device.

According to the embodiments of the present disclosure described above, it is possible to implement a more appropriate operation for a user's manipulation by reflecting the state of an electronic device on the operation.

DETAILED DESCRIPTION OF THE EMBODIMENTS

Figure 1:
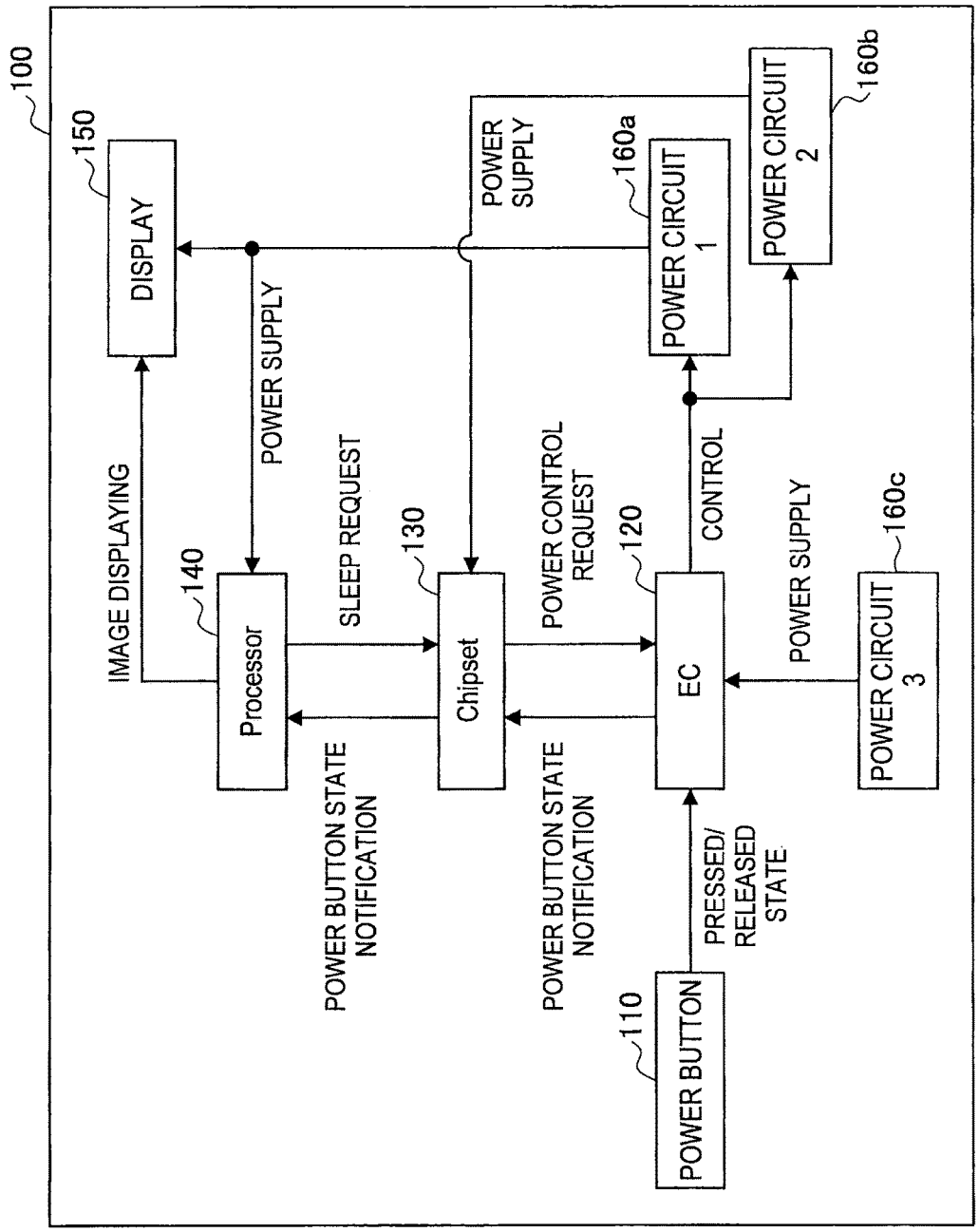
FIG. 1 is a block diagram illustrating a schematic configuration of a personal computer according to a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the descriptions will be given in the following order.

1. First Embodiment
1-1. Electronic Device Configuration
1-2. Power Control Example
2. Second Embodiment
2-1. Electronic Device Configuration
2-2. Power Control Example
3. Third Embodiment
3-1. Electronic Device Configuration
3-2. Command Control Example 4. Fourth Embodiment
5. Hardware Configuration Example of Information Processing Apparatus
6. Supplement (1. First Embodiment)

(1-1. Electronic Device Configuration)

FIG. 1 is a block diagram illustrating a schematic configuration of a personal computer according to a first embodiment of the present disclosure. With reference to FIG. 1, a personal computer 100 includes a power button 110, an EC (Embedded Controller) 120, a chipset 130, a processor 140, a display 150, and a power circuit 160.

The personal computer 100 can be, for example, a notebook, tablet, or desktop computer. When the personal computer 100 is a desktop computer, the display 150 may be connected, as an external device, to the personal computer 100. The personal computer 100 can also have input devices such as a keyboard, a mouse, and a touch panel, in addition to the illustrated components. The personal computer 100 may also have an output device such as a speaker, in addition to the display 150. Further, the personal computer 100 may have: a drive; a connection port or a communication device; and the like. The drive executes reading and writing from and to a memory, a storage, or a removable recording medium any of which has a program and other data stored therein, the program being executed by the processor 140. The external device is connected to the connection port, and the communication device executes network communication. Note that a more specific example of the unillustrated components is provided in a hardware configuration example of an information processing apparatus to be described later.

The power button 110 is a hardware button provided on an enclosure of the personal computer 100. The power button 110 is, for example, a push switch, and acquires a pressing manipulation by a user. A pressed/released state of the power button 110 is notified to the EC 120 through signal wires.

The EC 120 detects the pressed/released state of the power button 110 through the signal wires, and executes power control of the personal computer 100, that is, control of the power circuit 160 according to a duration of the pressing manipulation of the power button 110. The EC 120 operates even during shutdown of the personal computer 100, and thus can also execute power control for booting or rebooting the personal computer 100. The EC 120 can also notify the chipset 130 of the pressed/released state of the power button 110 detected while the personal computer 100 is running. Note that the details of the power control by the EC 120 will be described later.

The chipset 130 controls a hard disk drive installed as a storage, an external connection device connected to a USB port, and the like. The chipset 130 is connected to the EC 120 and notifies the processor 140 of the pressed/released state of the power button 110 notified from the EC 120. When receiving a request for transition to a power saving state from the processor 140, the chipset 130 issues, to the EC 120, a request for power control for the transition. Note that the chipset 130 does not operate during the shutdown of the personal computer 100, unlike the EC 120.

The processor 140 operates, for example, an OS (Operating System) and executes processing for controlling image display on the display 150. The processor 140 is connected to the chipset 130 and is notified of the pressed/released state of the power button 110 from the chipset 130. In the present embodiment, when the pressing manipulation (kept for less than 4 seconds) of the power button 110 is detected while the personal computer is running, the processor 140 requests the chipset 130 for transition to a power saving state (sleep). The EC 120 executes the power control in response to the request. When the personal computer 100 is in the power saving state, the processor 140 does not operate. Like the chipset 130, the processor 140 does not operate also during shutdown of the personal computer 100.

The display 150 is a display device such as an LCD (Liquid Crystal Display) and displays an image under the control of the processor 140. The display 150 is an example of an output unit that outputs information for the user. After the personal computer 100 transitions to the power saving state, or when the personal computer 100 is shut down, the processor 140 does not operate, and thus the display 150 does not operate, either. In other words, no image is displayed. Note that in the present embodiment, the personal computer 100 is not provided with a separate indicator for a power state. Accordingly, the user knows a power state of the personal computer 100 according to the displaying state of the display 150. More specifically, when the display 150 displays an image, the user can judge that the personal computer 100 is running. When the display 150 does not display an image, the user can judge that the personal computer 100 is shut down or is in the power saving state.

The power circuit 160 includes power circuits 160a, 160b, and 160c. The power circuit 160 supplies power to the components of the personal computer 100 by connecting the components to a battery of the personal computer 100 or an external power supply connected to the personal computer 100. While the personal computer 100 is running, the power circuit 160a is on under the control of the EC 120 and supplies power to the processor 140 and the display 150. Accordingly, the processor 140 and the display 150 operate, only while the personal computer 100 is running.

In contrast, while the personal computer 100 is running and in the power saving state, the power circuit 160b is on under the control of the EC 120 and supplies power to the chipset 130. Accordingly, while the personal computer 100 is running and in the power saving state, the chipset 130 operates. This enables the personal computer 100 to restore quickly from the power saving state. Meanwhile, the power circuit 160c is on to supply power to the EC 120, even while the personal computer 100 is shut down. Accordingly, the EC 120 detects a pressing manipulation of the power button 110, for example, in a state where the personal computer 100 is shut down, and can execute the power control for booting the personal computer 100.

(1-2. Power Control Example)

Figure 2:
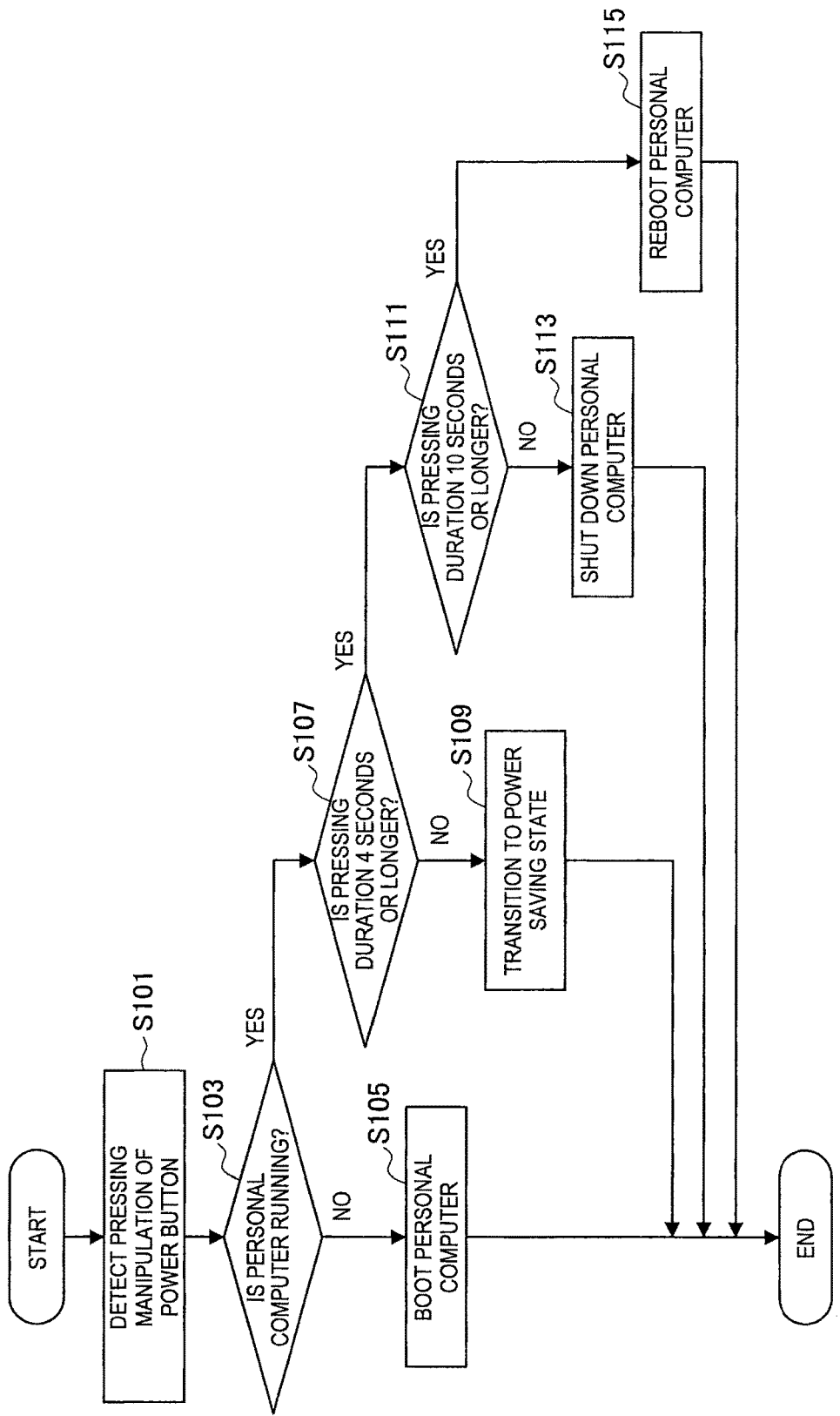
FIG. 2 is a flowchart illustrating an example of power control of the personal computer in the first embodiment of the present disclosure.

FIG. 2 is a flowchart illustrating an example of power control of the personal computer in the first embodiment of the present disclosure.

With reference to FIG. 2, the EC 120 detecting a pressing manipulation of the power button 110 (Step S101) firstly determines whether the personal computer 100 is running (Step S103). Here, when the personal computer 100 is not running, that is, in the power saving state or in a shutdown state (NO), the EC 120 boots the personal computer 100 (Step S105). More specifically, the EC 120 turns on any of the power circuits 160b and 160c which is off (the power circuit 160a is already turned on), and makes operable all of the chipset 130, the processor 140, and the display 150.

On the other hand, when it is determined in Step S103 described above that the personal computer 100 is running (YES), the power control to be executed by the EC 120 depends on a duration of the pressing manipulation of the power button 110 (hereinafter, also referred to as a pressing duration). It can be said in this case that the EC 120 selectively executes one of power controls associated with respective pressing durations of the power button 110. In the illustrated example, the EC 120 determines whether the pressing duration of the power button 110 is 4 seconds or longer (Step S107). Here, when the pressing of the power button 110 is stopped within less than 4 seconds (NO), the EC 120 executes power control for causing the personal computer 100 to transition to the power saving state (Step S109). More specifically, the EC 120 turns off only the power circuit 160*c*. On the other hand, when it is determined in Step S107 described above that the pressing duration of the power button 110 is 4 seconds or longer (YES), the EC 120 determines whether the pressing duration of the power button 110 is 10 seconds or longer (Step S111). Here, when the pressing is stopped within a period from 4 seconds to less than 10 seconds (NO), the EC 120 executes power control for shutting down the personal computer 100 (Step S113). More specifically, the EC 120 turns off both the power circuits 160*b* and 160*c*.

In the present embodiment, ordinary steps of shutting down the personal computer 100 are provided by the OS running on the processor 140. When the OS receives a shutdown instruction from the user, the processor 140 issues a request for power control to the EC 120 through the chipset 130. In contrast, shutdown processing resulting from keeping pressing the power button 110 for 4 seconds or longer can be executed, for example, in a case where the ordinary shutdown steps as described above are difficult to execute because the OS hangs up and becomes uncontrollable. The user can cause the OS to operate properly in the following manner, for example. The user keeps pressing the power button 110 for 4 seconds or longer to shut down the personal computer 100. Thereafter, the user presses the power button 110 again to reboot the OS on the processor 140. Note that in the case where the OS hangs up, the processor 140 does not issue a request for transition to the power saving state, and thus the personal computer 100 does not enter the power saving state. In other words, even though the pressing of the power button 110 is stopped within less than 4 seconds, the processing in Step S109 described above is not executed. The personal computer 100 remains on, and the OS remains hung up.

Further, when it is determined in Step S111 described above that the pressing duration of the power button 110 is 10 seconds or longer (YES), the EC 120 executes power control for rebooting the personal computer 100 (Step S115). More specifically, the EC 120 turns off the power circuits 160*b* and 160*c* to shut down the personal computer 100, and thereafter turns on the power circuits 160*b* and 160*c* again.

One of reasons why the power control processing described above is executed is that the personal computer 100 does not have a power state indicator other than the display 150 in the present embodiment. As described above, holding down the power button 110 (for 4 seconds or longer in the illustrated example) while the personal computer 100 is running occurs, for example, in the case where the OS operating on the processor 140 hangs up and becomes uncontrollable. In this case, if the OS hangs up in a state where the display 150 is displaying an image, the image on the display 150 disappears. The user can thereby know that the personal computer 100 is shut down.

In contrast, suppose a case where the OS hangs up in a state where the display 150 is not displaying an image (such as a case where: the user does not manipulate the personal computer 100 for a predetermined time; the processor 140 accordingly turns off the displaying on the display 150 and executes background processing; and a certain error occurs on the background processing). In this case, even though the user holds down the power button 110, the display 150 still displays no image, and thus the state of the display 150 does not change. Thus, it is difficult for the user to know whether the personal computer 100 is shut down. Further, when no image is displayed on the display 150, it is also difficult for the user to know whether the personal computer 100 is running. For example, in a case where, the user holds down the power button 110 when no image is displayed on the display 150, but where no image is still displayed on the display 150, it is difficult for the user to know whether: the personal computer 100 is out of order and thus is prevented from being booted; or no image is displayed due to hung-up of the OS, although the personal computer 100 is running.

For example, if the personal computer 100 is provided with an indicator, such as a lamp indicating a power state, in addition to the display 150, the user views whether the indicator lights up and thereby can know whether the personal computer 100 is running or shut down. However, such an indicator is not provided in the present embodiment. In addition, if other indicators, such as an indicator for connection from an external power supply, an indicator for access to the storage, and an indicator for a battery state, are provided in addition to the indicator for the power state, the user might not fully understand what are indicated by the respective indicators.

When the pressing duration of the power button 110 is 10 seconds or longer in the present embodiment as described above, the personal computer 100 is rebooted. In other words, holding down the power button 110 for a long time results in a running state of the personal computer 100. Accordingly, when the personal computer 100 freezes with the display 150 displaying no image, the user may keep pressing the power button 110 for 10 seconds or longer. If the personal computer 100 has been shut down, the manipulation causes the personal computer 100 to be booted (although the user does not have to keep pressing the power button 110 for 10 seconds or longer). In contrast, suppose a case where the personal computer 100 is running, but no image is displayed because the OS hangs up. In this case, this manipulation can cause the personal computer 100 to be rebooted and to operate properly.

Here, suppose a case where the display 150 displays no image after the power button 110 is held down for 10 seconds or longer. In this case, it is inferred that the personal computer 100 has an anomaly (such as a hardware breakdown or an OS error) while the personal computer 100 is running. In this case, for example, a general user calls a call center, because it is difficult for the user to recover the personal computer 100. Since holding down the power button 110 for a long time can cause the personal computer 100 to run, it is easy to judge the state of the personal computer 100 (whether the personal computer 100 is out of order) also in such a case, based on whether the holding down the power button 110 can cause the personal computer 100 to run. For example, in response to the user's call "the personal computer 100 does not run although power button is pressed", a call center clerk may answer "keep pressing the power button for 10 seconds or longer". If the OS has hung up and become uncontrollable, for example, the personal computer 100 will be rebooted. Thus, it is possible to easily judge whether the personal computer 100 is out of order as the user reports.

Figure 3:
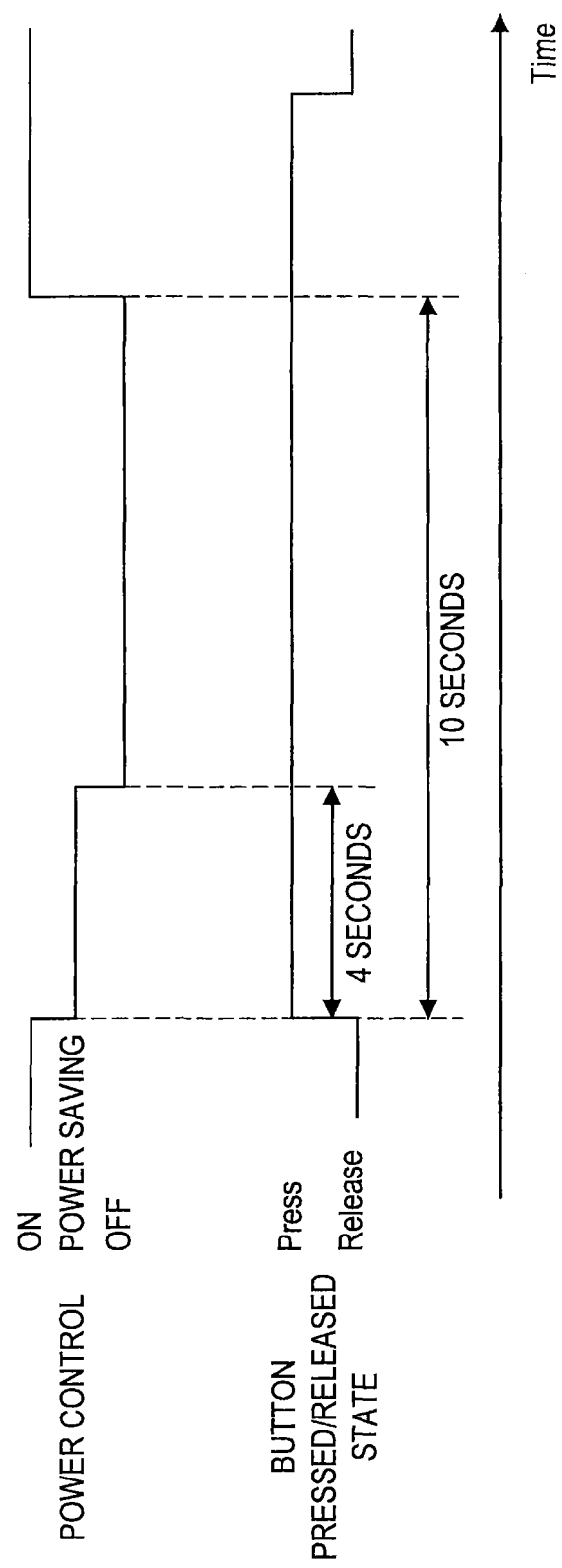
FIG. 3 is a diagram illustrating a relationship between a pressed/released state of a power button and a state of power control in the personal computer according to the first embodiment of the present disclosure.

FIG. 3 is a diagram illustrating a relationship between a pressed/released state of a power button and a state of power control in the personal computer according to the first embodiment of the present disclosure. With reference to FIG. 3, when the power button 110 is pressed (Release→Press), the EC 120 executes power control for transition of the power state of the personal computer 100 to a power saving state. Specific steps have already been described, and thus a description thereof is omitted. The EC 120 consequently turns off the power circuit 160a and stops power supply to the processor 140 and the display 150. This causes the personal computer 100 to transition to the power saving state. When the user stops pressing (Press Release) before 4 seconds pass after the start of pressing the power button 110, the personal computer 100 remains in the power saving state.

On the other hand, if the user keeps pressing the power button 110 even after 4 seconds pass after the start of pressing the power button 110, the EC 120 executes power control for forcedly shutting down the personal computer 100. More specifically, the EC 120 turns off the power circuit 160b without using the chipset 130 (the power circuit 160a has already been turned off), and stops power supply to not only the processor 140 and the display 150 but also the chipset 130. This stops operations of the components other than the EC 120 and the power circuit 160c, so that the personal computer 100 is shut down. When the user thereafter stops the pressing (Press→Release) before 10 seconds pass after the start of pressing the power button 110, the personal computer 100 remains in the shutdown state.

Further, if the user keeps pressing the power button 110 even after 10 seconds pass after the start of pressing the power button 110, the EC 120 executes power control for rebooting the personal computer 100. More specifically, the EC 120 turns on the power circuits 160a and 160b again (the power circuit 160c remains on during the shutdown) and restarts power supply to the chipset 130, the processor 140, and the display 150. This causes the chipset 130, the processor 140, and the display 150 to operate again and the personal computer 100 to be rebooted. If the processor 140 and the display 150 operate properly, the display 150 displays an image at this time. Even if the pressing manipulation of the power button 110 is thereafter stopped at any timing (Press→Release), the personal computer 100 remains in the running state. When the pressing of the power button 110 is stopped and thereafter the power button 110 is pressed again (Release→Press), the same processing as described so far can be repeated.

In the first embodiment of the present disclosure as described above, keeping pressing the power button 110 for 10 seconds or longer is used as information indicating that the display 150 is not outputting information. In other words, in a case where an image, that is, certain information is displayed on the display 150, the display 150 stops displaying the image at latest when the personal computer 100 is shut down due to keeping pressing the power button 110 for 4 seconds or longer, regardless of the state of the OS running on the processor 140. Thus, the user can obtain feedback on the pressing of the power button 110 and thus stop the pressing. Nevertheless, when the pressing of the power button 110 continues and a duration thereof reaches 10 seconds, it is inferred that the user does not obtain feedback by using the display 150, that is, the display 150 remains in the state where no image is displayed before and after the power button 110 is pressed. Hence, when the pressing duration is 10 seconds or longer, the EC 120 switches the power control for the case where the pressing duration is 4 seconds or longer, that is, the power control for shutting down the personal computer 100, to the power control for rebooting the personal computer 100.

Note that various modifications in addition to the example described above can be made to the first embodiment of the present disclosure. For example, the personal computer 100 illustrated above has the chipset 130 and the processor 140, but may use a SoC (System on a Chip) having a function to which functions of the chipset 130 and the processor 140 are integrated. The SoC uses a technique of designing an integrated circuit to which a series of necessary functions (a system) is integrated on a single semiconductor chip. Personal computers often have functions of a processor and a chipset which are integrated on a SoC.

In addition, in the personal computer 100 illustrated above, the processor 140 requests the EC 120 for the transition to the power saving state, through the chipset 130, but the power control is not limited to this example. For example, the processor 140 or the chipset 130 may execute the power control for the transition to the power saving state. The electronic device according to an embodiment of the present disclosure is not limited to such a personal computer as in the first embodiment, and may be any device using control of boot, shutdown, and the like, such as a smartphone, a tablet terminal, a game machine, or a media player. A control unit of such a device including a personal computer does not necessarily include all of an EC, a chipset, and a processor. The power control as described in the present embodiment can be executed by any type of control unit capable of executing power control. An expression "a controller or a processor" in this specification means any one of or any combination of an EC, a chipset, a processor, and any other control unit as described above.

The power button 110 of the personal computer 100 illustrated above is a push switch, but the type of the power button is not limited to the push switch. The switch may be any switch capable of detecting pressing of the switch, such as a capacitance switch. In addition, instead of the power button, another type of handler such as a sliding switch may be used to acquire manipulation for power control.

In the personal computer 100 illustrated above, shutdown is executed when the pressing duration of the power button 110 is 4 seconds or longer, and reboot is executed when the pressing duration is 10 seconds or longer. However, a duration threshold for control switching to be executed is not limited to the aforementioned example. Any threshold may be set depending on, for example, characteristics of a device or the taste of the user.

In the personal computer 100 illustrated above, when the power button 110 is pressed, transition to a power saving state is executed. However, instead of this timing, when the pressing of the power button 110 is thereafter stopped within 4 seconds, the transition to the power saving state may be executed. Note that various names may be used for the power saving state, such as a sleep state, a stand-by state, and a hibernation state, depending on the system.

In the personal computer 100 illustrated above, the three types of controls which are transitions to a power saving state, shutdown, and reboot are selectively executed according to the pressing duration of the power button 110. However, more or less types of these may be used. For example, the power saving state may be omitted, and the other two types of controls may be selectively executed in the aforementioned example of the personal computer 100. In this case, for example, keeping pressing the power button 110 for less than 4 seconds may cause nothing to occur, keeping pressing for a period from 4 seconds to less than 10 seconds may cause shutdown execution, and keeping pressing for 10 seconds or longer may cause reboot execution. Moreover, for example, a control which is "displaying a shutdown confirmation screen on the display 150" may be added, and keeping pressing the power button 110 for less than 4 seconds may cause transition to a power saving state, keeping pressing for a period from 4 seconds to less than 8 seconds may cause a confirmation screen to be displayed, keeping pressing for a period from 8 seconds to less than 12 seconds may cause shutdown, and keeping pressing for 12 seconds or longer may cause reboot execution. It goes without saying that thresholds of the durations such as 4 seconds, 8 seconds, and 12 seconds mentioned above are not limited to the aforementioned examples, and any threshold may be set.

(2. Second Embodiment)

(2-1. Electronic Device Configuration)

Figure 4:
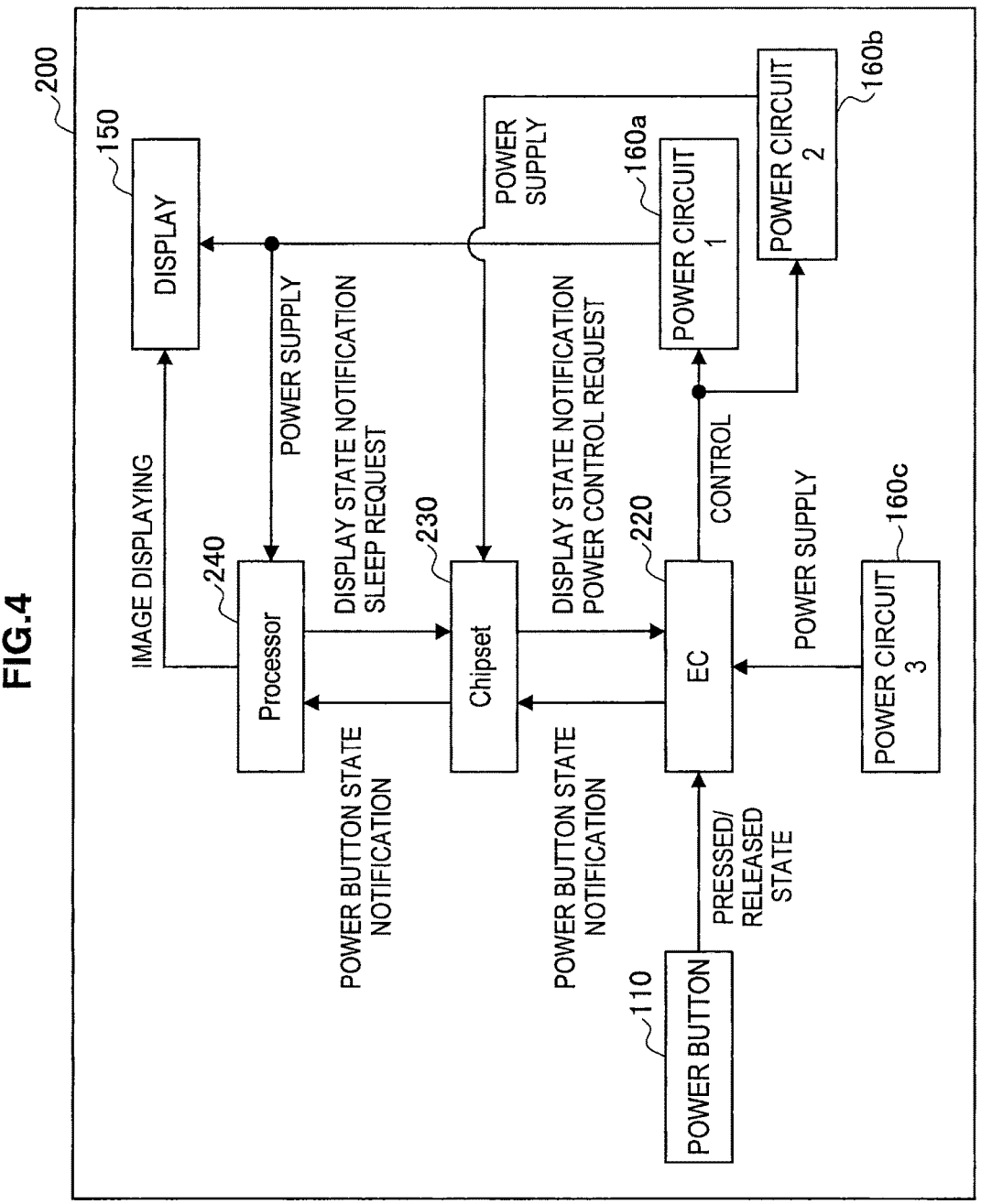
FIG. 4 is a block diagram illustrating a schematic configuration of a personal computer according to a second embodiment of the present disclosure.

FIG. 4 is a block diagram illustrating a schematic configuration of a personal computer according to a second embodiment of the present disclosure. With reference to FIG. 4, a personal computer 200 includes the power button 110, an EC 220, a chipset 230, a processor 240, the display 150, and the power circuit 160.

The personal computer 200 may have the same configuration as that in the first embodiment described above. However, power control by the EC 220, and operations of the chipset 230 and the processor 240 all of which will be described later are different from those in the first embodiment, and thus this point will mainly be described. Components other than these are denoted with the same reference numerals, and thereby repeated explanation thereof is omitted.

The EC 220 detects a pressed/released state of the power button 110 through signal wires, and executes power control of the personal computer 200, that is, control of the power circuit 160 according to a duration of a pressing manipulation of the power button 110. The EC 220 operates even during shutdown of the personal computer 200, and thus can also execute power control for booting or rebooting the personal computer 200. The EC 220 may also notify the chipset 230 of the pressed/released state of the power button 110 detected while the personal computer 200 is running.

Further, the EC 220 monitors a state of the display 150 while the personal computer 200 is running, through the chipset 230 and the processor 240. By monitoring the state, the EC 220 acquires, for example, whether the display 150 is displaying an image, that is, outputting information. Note that in the present embodiment, the chipset 230 and the processor 240 have a function of notifying the EC 220 of the state of the display 150, in addition to the same functions of the chipset 130 and the processor 140 in the first embodiment described above.

Here, the processor 240 may notify the EC 220, for example, of the state of the display 150 regularly, or of a changed state of the display 150 when the state is changed. At this time, the EC 220 holds information acquired through the notification to use the information for judging whether to perform power control when the power button 110 is pressed.

Like the foregoing first embodiment, for example, when the personal computer 200 does not have an indicator for a power state, whether the display 150 is displaying an image can be the key for the user to know the power state of the personal computer 200. In the present embodiment, the EC 220 acquires this information by monitoring the state of the display 150 via the chipset 230 and the processor 240.

(2-2. Power Control Example)

Figure 5:
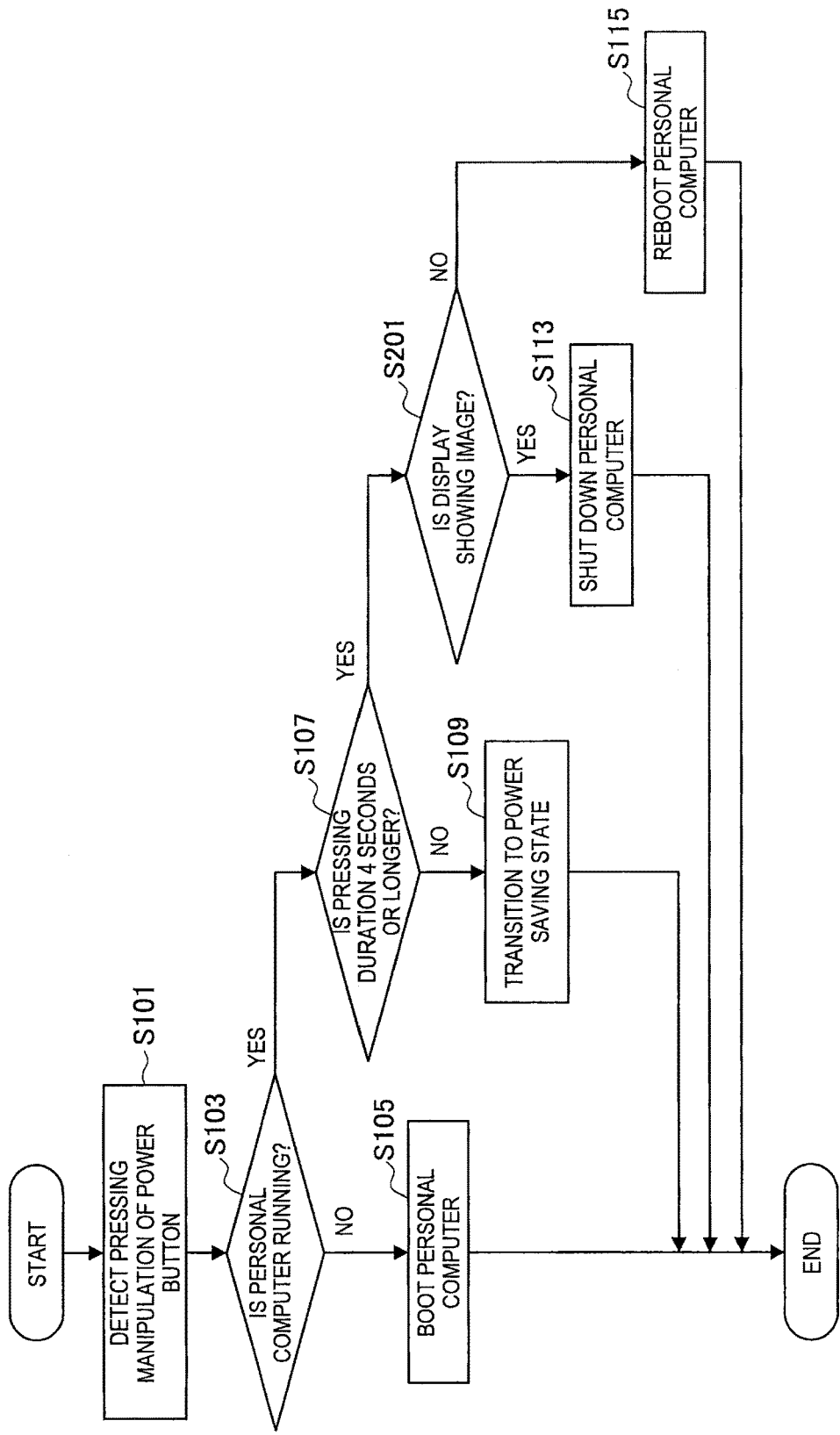
FIG. 5 is a flowchart illustrating an example of power control of the personal computer in the second embodiment of the present disclosure.

FIG. 5 is a flowchart illustrating an example of power control of the personal computer in the second embodiment of the present disclosure. Note that in FIG. 5, steps other than Step S201 are the same as those described above with reference to FIG. 2 and thus are denoted with the same reference numerals, and thereby repeated explanation thereof is omitted.

When the pressing duration of the power button 110 is 4 seconds or longer in Step S107 (YES), the EC 220 determines whether the display 150 is displaying an image, based on the information acquired from the processor 240 through the chipset 230 (Step S201). Here, when the display 150 is displaying an image (YES), the EC 220 executes power control for shutting down the personal computer 200 (Step S113). On the other hand, when the display 150 is not displaying an image (NO), the EC 220 executes power control for rebooting the personal computer 200 (Step S115).

Such power control processing eliminates a long wait time (for example, 10 seconds) after pressing the power button 110, unlike the first embodiment, and enables appropriate processing for the case where the user does not (is supposed not to) obtain feedback on the pressing the power button 110 due to displaying no image on the display 150, that is, enables the personal computer 200 to be rebooted.

In the second embodiment of the present disclosure as described above, the EC 220 acquires information indicating that the display 150 is not outputting information, by monitoring the display 150 through the chipset 230 and the processor 240. For this reason, when the power button 110 is kept pressed for 4 seconds or longer, whether the user can obtain feedback on the pressing of the power button 110 can be inferred based on whether the display 150 is displaying an image. Execution of power control for shutting down or rebooting the personal computer 200 based on the inference can give appropriate feedback to the user in both cases of displaying and not displaying an image on the display 150.

Note that the information indicating that the display 150 is not outputting information may be directly inputted to the EC 220 from the display 150 through the signal wires or the like. In this case, for example, even when the display 150 by itself erases an image after the OS hangs up, the EC 220 can know that the display 150 is not outputting the information.

In addition, the modifications described in the first embodiment above are also applicable to the second embodiment.

(3. Third Embodiment)

(3-1. Electronic Device Configuration)

Figure 6:
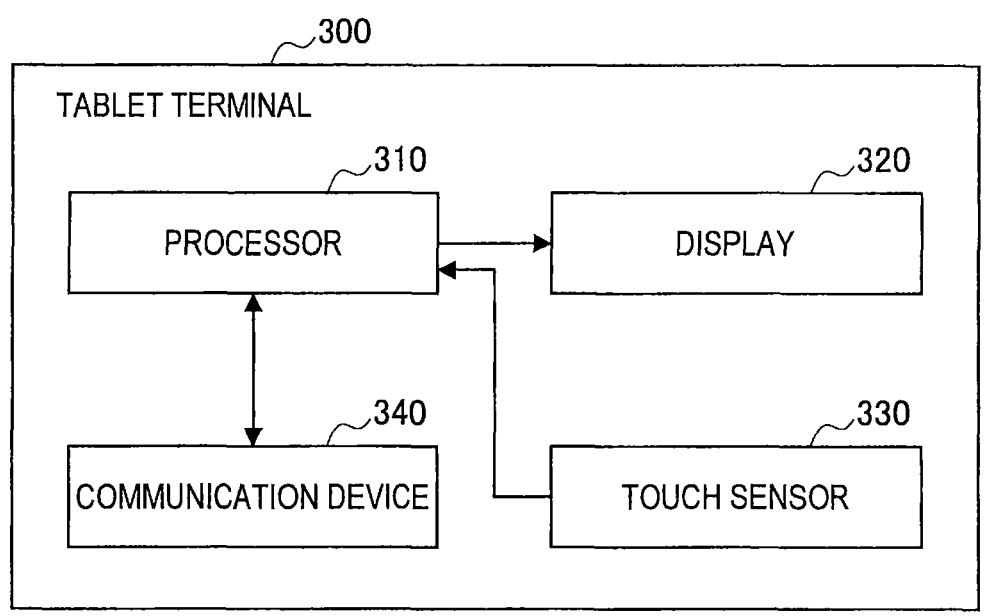
FIG. 6 is a block diagram illustrating a schematic configuration of a tablet terminal according to a third embodiment of the present disclosure.

FIG. 6 is a block diagram illustrating a schematic configuration of a tablet terminal according to a third embodiment of the present disclosure. With reference to FIG. 6, a tablet terminal 300 includes a processor 310, a display 320, a touch sensor 330, and a communication device 340. Note that the tablet terminal 300 can include various controllers, power circuits, a memory, a storage, a connection port, and the like in addition to the illustrated components. Note that the more specific examples of the unillustrated components have been provided in the first and second embodiments and the hardware configuration example of the information processing apparatus to be described later.

The processor 310 executes, for example, processing for operating the OS and for controlling image display on the display 320. The processor 310 may execute processing according to a user's manipulation acquired through a manipulation unit such as the touch sensor 330. The touch sensor 330 is arranged, for example, on the display 320, thus is a component of a touch panel, and acquires a touch manipulation performed by the user. The processor 310 causes the display 320 to display an image that functions as a GUI (Graphical User Interface), for manipulation input utilizing the touch panel. The display 320 is a display device such as an LCD. The processor 310 can acquire content on a network through network communication executed by the communication device 340 and provide an application function for the user's viewing by displaying the acquired content on the display 320. The communication device 340 executes the network communication, for example, through the Internet, a LAN (Local Area Network), or the like.

Figure 7:
FIG. 7 is a diagram illustrating an example of a screen of an application function provided in the third embodiment of the present disclosure.

FIG. 7 is a diagram illustrating an example of a screen of an application function provided in the third embodiment of the present disclosure. With reference to FIG. 7, the display 320 displays a screen 3200 for a web browser function in the present embodiment. Note that the web browser function is an example of the application function for viewing, on the network, content acquired through the network communication.

The screen 3200 may include various buttons such as a back button 3201, a forward button 3203, an update button 3205, an abort button 3207, and a home button 3209. These buttons are displayed as a GUI on the display 320. The user's touch manipulation in any of regions associated with the respective buttons is detected by the touch sensor 330 and is provided to the processor 310 as a pressing manipulation of the corresponding button. Accordingly, it can also be said that the touch sensor 330 is a manipulation unit configured to acquire a pressing manipulation of the corresponding button which is the GUI. Note that the screen 3200 may further include an address bar 3211 and the like.

In the present embodiment, the processor 310 selectively executes one of a plurality of command controls of a web browser according to the duration of the pressing manipulation of the back button 3201 acquired by the touch sensor 330. Accordingly, processing performed when the back button 3201 is pressed will particularly be described below. Since publicly known technology is applicable to operations and functions of the other buttons and bars, detailed descriptions thereof are omitted. However, like the back button 3201, these handlers may be assigned a plurality of controls one of which is selectively executed according to the pressing duration.

(3-2. Command Control Example)

Figure 8:
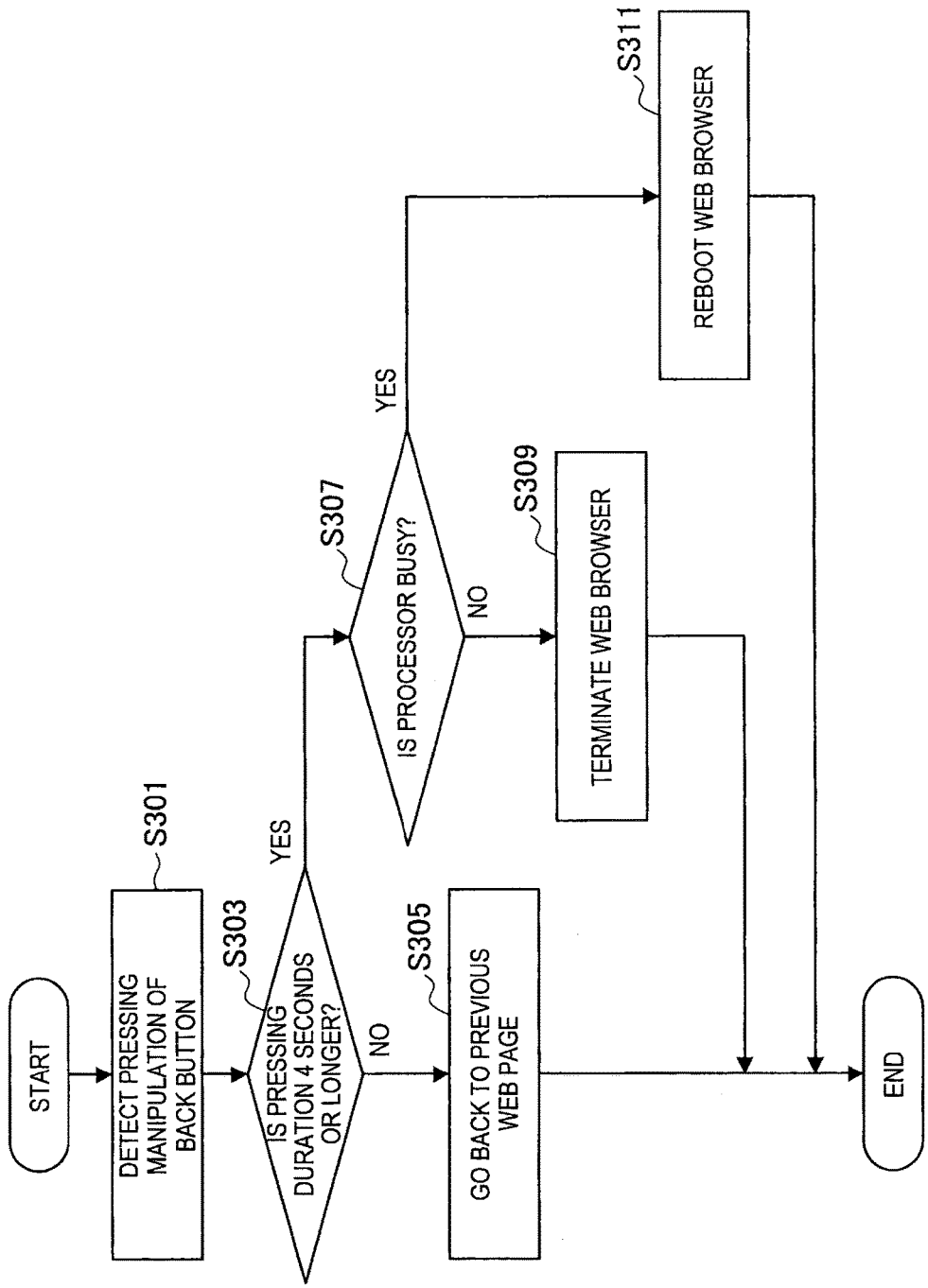
FIG. 8 is a flowchart of a first example illustrating command control by a web browser function in the third embodiment of the present disclosure.

FIG. 8 is a flowchart of a first example illustrating command control by the web browser function in the third embodiment of the present disclosure. In the first example, the processor 310 determines whether the web browser function operates properly, based on the processing state of the web browser function of the processor 310.

With reference to FIG. 8, the processor 310 detects a pressing manipulation of the back button 3201 (Step S301), and determines whether the duration of pressing the back button 3201 (hereinafter, also referred to as a pressing duration) is 4 seconds or longer (Step S303). Here, when the pressing is stopped within a pressing duration of less than 4 seconds (NO), the processor 310 executes control for changing the content viewed by using the web browser function, that is, the web page back to the previous page (Step S305). More specifically, the processor 310 reads the previous web page cached in the memory to display the previous web page on the display 320. Alternatively, the processor 310 causes the communication device 340 to execute the network communication, to acquire the previous web page again, and to display the previous web page on the display 320.

On the other hand, when the pressing duration of the back button 3201 is 4 seconds or longer in Step S303 described above (YES), the processor 310 determines whether the web browser function of the processor 310 is busy (Step S307). More specifically, the processor 310 can judge whether a process of the web browser function among processes executed by the processor 310 is busy. Here, when the web browser function of the processor 310 is not busy (NO), the processor 310 executes control for terminating the web browser function (Step S309).

In the first example as described above, if the web browser function of the processor 310 is not busy and is executed properly, holding down the back button 3201 (for 4 seconds or longer) results in execution of a command for terminating the web browser function. This can provide a high operability GUI, that is, the user can terminate the web browser only by holding down the frequently used back button 3201, without using an end button separately provided or an end item in the menu.

On the other hand, when the web browser function of the processor 310 is busy in Step S307 described above (YES), the processor 310 executes control for rebooting the web browser function (Step S311). In this case, the processor 310 can recognize that the web browser function is terminated in a state where the web browser function is not executed properly, and thus may try, at the time of rebooting, to fix the state of the web browser such as a web page viewed immediately before the termination.

In the first example as described above, if the web browser function of the processor 310 is busy and is not executed properly, holding down the back button 3201 (for 4 seconds or longer) results in reboot of the web browser function. This can cause recognition of a situation in which the user is originally not intended to terminate the web browser function but holds down the back button 3201 to terminate the web browser function because the web browser function stops operation. It is thereby possible to implement rebooting the web browser function which is supposed to be intended by the user, without waiting for manipulation for rebooting the web browser by the user.

Figure 9:
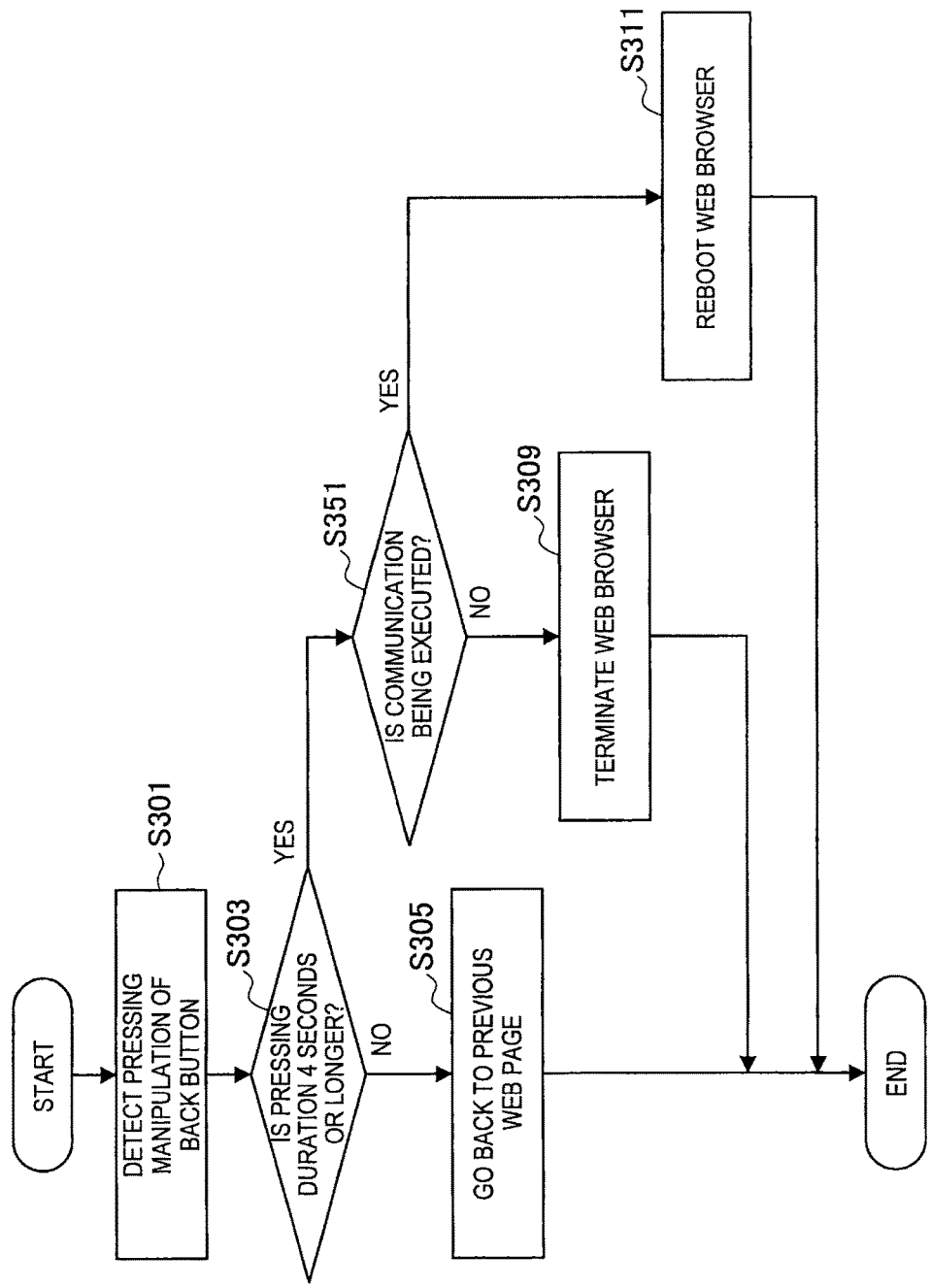
FIG. 9 is a flowchart of a second example illustrating processing by the web browser function in the third embodiment of the present disclosure.

FIG. 9 is a flowchart of a second example illustrating processing by the web browser function in the third embodiment of the present disclosure. Note that in FIG. 9, steps other than Step S351 are the same as those described above with reference to FIG. 8 and thus are denoted with the same reference numerals, and thereby repeated explanation thereof is omitted. In the second example, the processor 310 determines whether the web browser function operates properly, based on a processing state of the communication device 340.

When the pressing duration of the back button 3201 is 4 seconds or longer in Step S303 (YES), the processor 310 determines whether the communication device 340 is executing communication for the web browser function, that is, communication for acquiring a web page (Step S351). Here, the communication for acquiring the web page may be limited to, for example, communication for acquiring a part excluding an element to be occasionally updated, such as a moving image or an advertisement in the page. Accordingly, the processor 310 may execute the determination not only by checking the operation state of the communication device 340 but also by verifying the content of data received by the communication device 340.

When the communication device 340 is not executing the communication for the web browser function in Step S351 described above (NO), the processor 310 executes control for terminating the web browser function (Step S309). On the other hand, when the communication device 340 is executing the web browser function in Step S351 (YES), the processor 310 executes control for rebooting the web browser function (Step S311). In this case, the processor 310 can recognize that the web browser function is terminated in a state where the next web page is not read, and thus may try, at the time of rebooting, to fix the state of the web browser such as a web page viewed immediately before the termination.

In the second example as described above, if the communication device 340 is executing the communication for acquiring the web page, holding down the back button 3201 (for 4 seconds or longer) results in reboot of the web browser function. This can cause recognition of a situation in which the user holds down the back button 3201 to terminate the web browser function because it takes a long time to read a web page due to a busy state or the like of a communication target server. It is thereby possible to implement rebooting the web browser function which is supposed to be intended by the user, without waiting for manipulation for rebooting the web browser by the user.

In the third embodiment of the present disclosure described above, for the web browser function which is one of functions provided by the tablet terminal 300, a command control selectively executed according to the pressing duration of the back button 3201 displayed as the GUI is switched according to information indicating whether the web browser function is operating properly. The information used here may be, for example, information indicating the processing state of the web browser function of the processor 310 as in the foregoing first example, or may be information indicating the communication state executed by the communication device 340 for the web browser function as in the foregoing second example. The first and second examples may be combined to judge the state of the web browser function based on the processing states of the processor 310 and the communication device 340.

As described above, the control according to an embodiment of the present disclosure does not have to be control of the entire electronic device such as power control, and may be, for example, command control of one of application functions provided by the electronic device. The manipulation unit is not limited to the button or the switch provided as hardware, and may be a pointing device such as a touch sensor that acquires a touch panel manipulation of an icon such as a button provided as a GUI.

Note that various modifications in addition to the examples described above can also be made to the third embodiment of the present disclosure. For example, also in an embodiment in which the command control of the application function is executed like the present embodiment, control switching can be implemented based on a pressing duration as in the first embodiment. For example, in the aforementioned examples: when a pressing duration of the back button 3201 displayed on the screen 3200 of the web browser is less than 4 seconds, a viewed web page may be changed to the previous page; when the duration ranges from 4 seconds to less than 10 seconds, the web browser function may be terminated; and when the duration is 10 seconds or longer, the web browser function may be rebooted.

In addition, an electronic device according to an embodiment identical to the present embodiment is not limited to the tablet terminal, and may be any device that can provide a function of viewing content on the network, such as a smartphone, a personal computer, a game machine, or a media player. In such a device, the aforementioned functions of the back button 3201 may not necessarily be provided as the GUI, and may be provided by using a button or a switch of hardware.

In the tablet terminal 300 illustrated above, 4 seconds is used as a threshold of the pressing duration of the back button 3201, but any threshold may be set. Further, the back button 3201 may be associated with controls such as "moving back to the previous page", "moving back to the second previous page", "moving back to the first page", and "moving back to the home page", and three or more types of controls may be selectively executed based on a plurality of thresholds set for the respective pressing durations. In this case, at least one of the controls selectively executed is switched over based on information indicating the state of, for example, the processor 310 or the communication device 340.

(4. Fourth Embodiment)

Subsequently, a fourth embodiment of the present disclosure will be described. The present embodiment may be implemented in addition to, for example, the configurations of the respective first to third embodiments. The present embodiment provides a function of setting switching of functions executed by a control unit of the electronic device.

Figure 10:
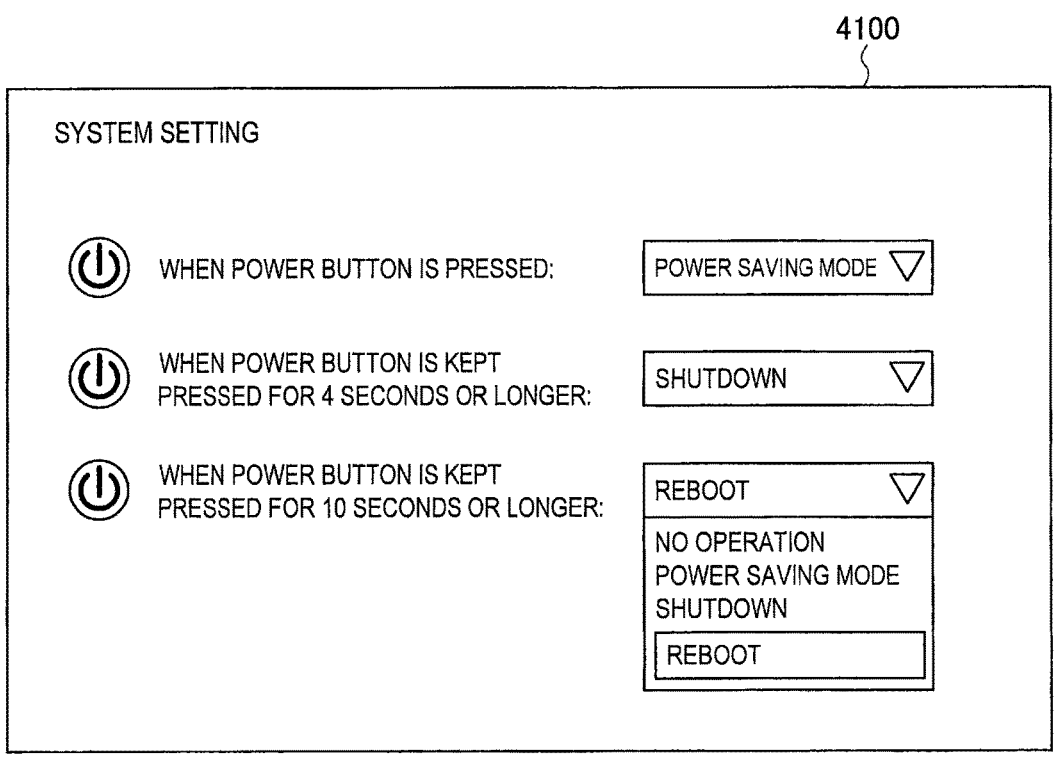
FIG. 10 is a diagram illustrating a first example of a setting screen provided in a fourth embodiment of the present disclosure.

FIG. 10 is a diagram illustrating a first example of a setting screen provided in the fourth embodiment of the present disclosure. The example in FIG. 10 shows a screen 4100 enabling selection from power controls resulting from keeping pressing the power button for 4 seconds or longer and keeping pressing for 10 seconds or longer in the power control of such a personal computer as in the foregoing first embodiment. The screen 4100 enables the user to select any one of the following in switching controls based on whether or not the pressing duration is 10 seconds or longer: power control before switching (control in the case where the pressing duration ranges from 4 seconds to less than 10 seconds: "shutdown" in the figure); and power control after switching (control in the case where the pressing duration is 10 seconds or longer: "reboot" in the figure). The user can also substantially disable the switching by selecting the same power control as the power control before the switching.

Figure 11:
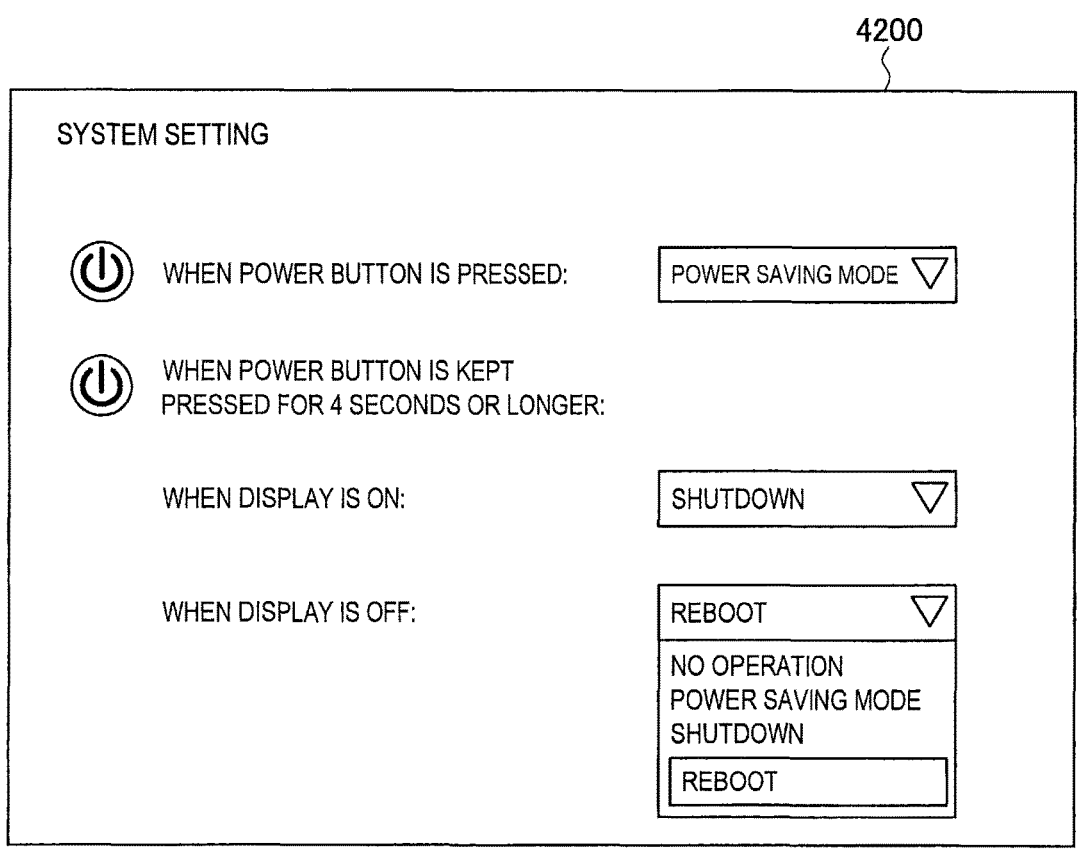
FIG. 11 is a diagram illustrating a second example of a setting screen provided in the fourth embodiment of the present disclosure.

FIG. 11 is a diagram illustrating a second example of a setting screen provided in the fourth embodiment of the present disclosure. The example in FIG. 11 shows a screen 4200 enabling selection from power controls in cases where the display is on and off when the power button is kept pressed for 4 seconds or longer, in the power control of such a personal computer as in the second embodiment. The screen 4200 enables the user to select any one of the following in switching power controls depending on whether the display is on or off: power control before switching (control in the case where the display is on: "shutdown" in the figure); and the power control after the switching (control in the case where the display is off: "reboot" in the figure). Like the foregoing first example, the user can also substantially disable the switching by selecting the same power control as the power control before the switching.

Figure 12:
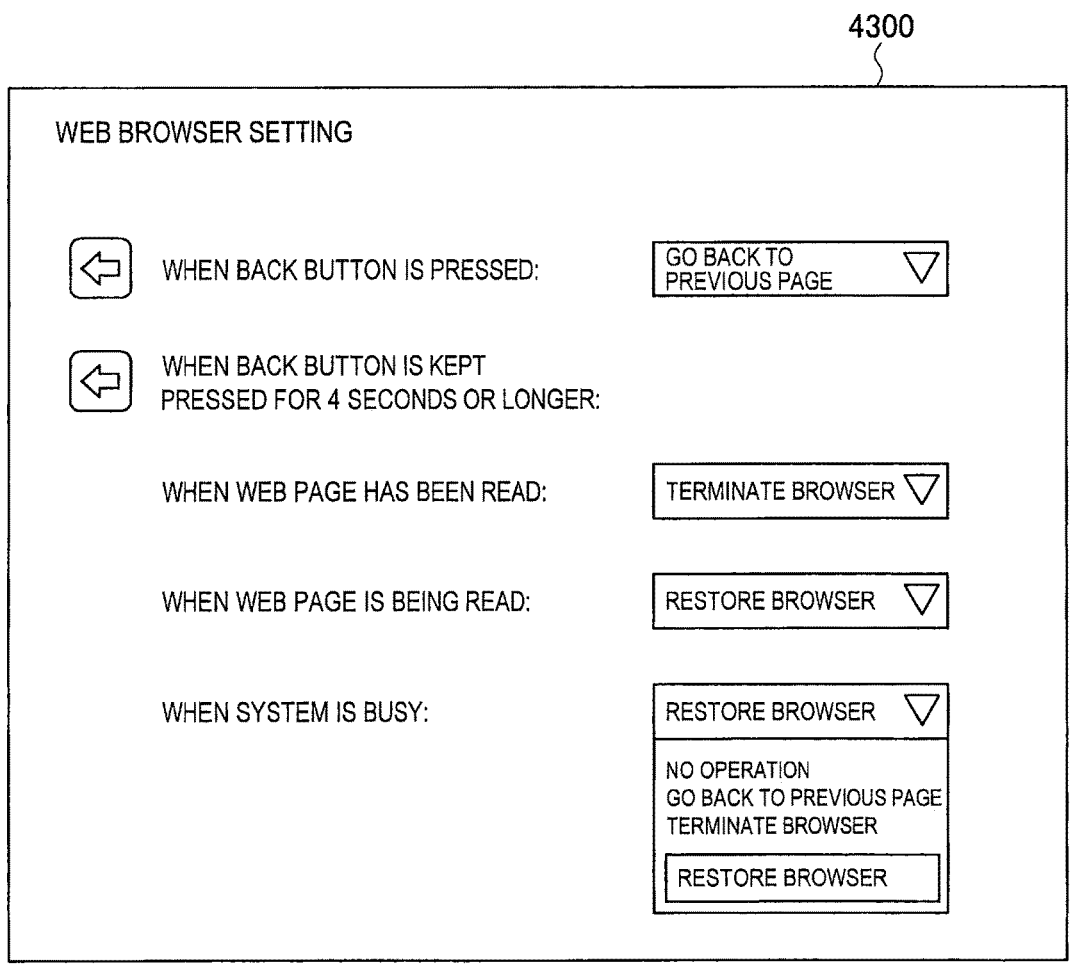
FIG. 12 is a diagram illustrating a third example of a setting screen provided in the fourth embodiment of the present disclosure.

FIG. 12 is a diagram illustrating a third example of a setting screen provided in the fourth embodiment of the present disclosure. The example in FIG. 12 shows a screen 4300. When the back button is kept pressed for 4 seconds or longer in controlling the web browser as in the third embodiment, the screen 4300 enables selection from command controls in cases where a web page has been read, a web page is being read, and the system is busy. Note that this example employs combination of the first and second examples in the aforementioned third embodiment. The screen 4300 enables the user to select any one of the following in switching the command control depending on the state of the web browser function: command control before switching (control in the case where a web page has been read: "terminate browser" in the figure); command control after the switching, based on the state of the communication device (control in the case where a web page is being read: "restore browser" in the figure); and command control after the switching, based on the state of the processor (control in the case where the system is busy: "restore browser" in the figure). The user can also substantially disable the switching by selecting the same command control as the power control before the switching.

As described above, in the fourth embodiment of the present disclosure, in control to be selectively executed according to a manipulation duration, the user can select, through the setting screen, any one of controls before and after the switching depending on information indicating the state of the electronic device. This enables the user to customize, for example, a user interface provided in any of the aforementioned embodiments, according to the usage or user's taste, thus leading to high operability.

(5. Hardware Configuration Example of Information Processing Apparatus)

Figure 13:
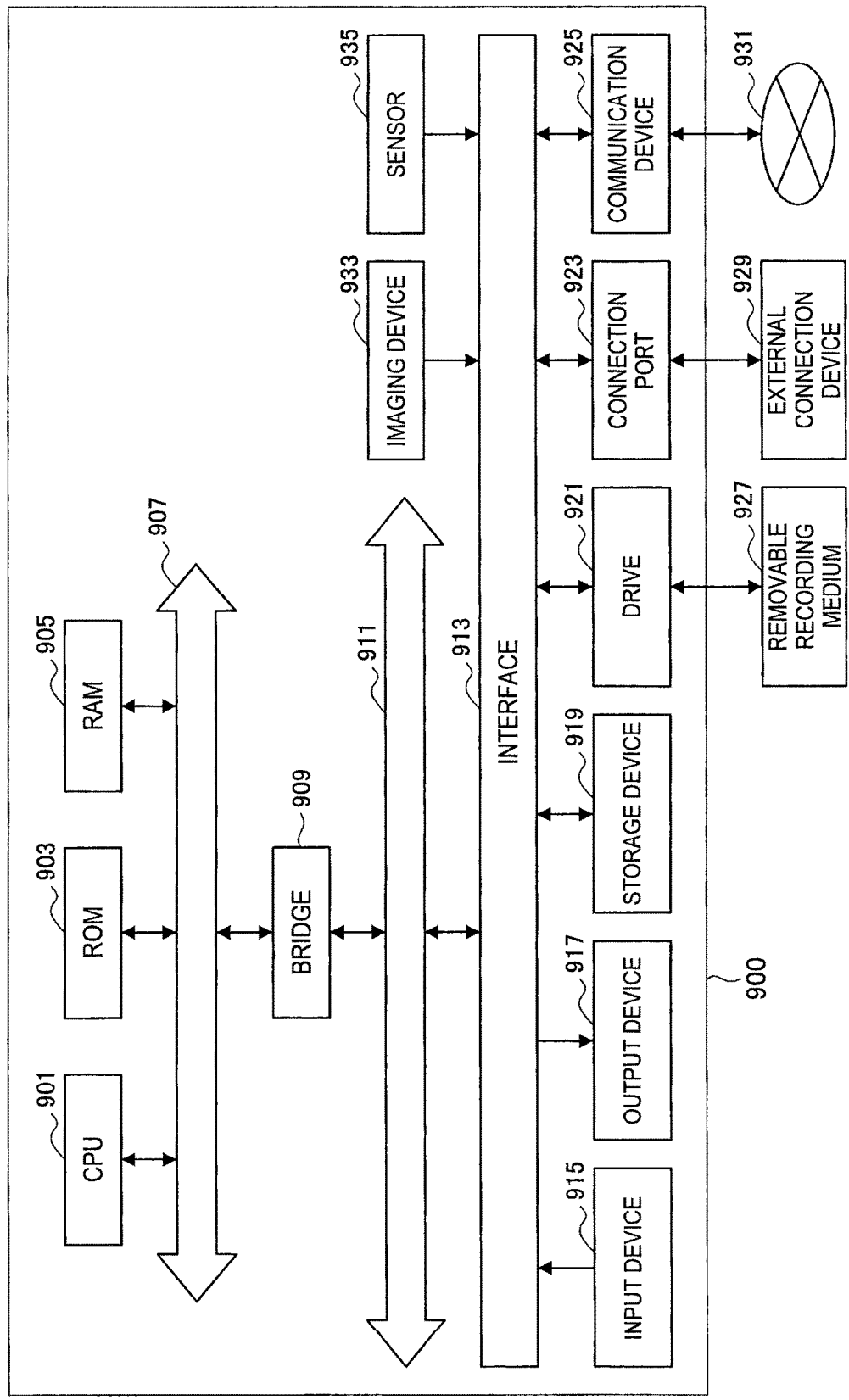
FIG. 13 is a block diagram for explaining a hardware configuration of an information processing apparatus.

Next, a hardware configuration of the information processing apparatus according to an embodiment of the present disclosure will be described with reference to FIG. 13. FIG. 13 is a block diagram for explaining the hardware configuration of the information processing apparatus. An information processing apparatus 900 illustrated in the figure may realize the personal computer, the tablet terminal, or the like in the aforementioned embodiments.

The information processing apparatus 900 includes a CPU (Central Processing Unit) 901, a ROM (Read Only Memory) 903, and a RAM (Random Access Memory) 905. In addition, the information processing apparatus 900 may include a host bus 907, a bridge 909, an external bus 911, an interface 913, an input device 915, an output device 917, a storage device 919, a drive 921, a connection port 923, and a communication device 925. Further, the information processing apparatus 900 may include an imaging device 933 and a sensor 935 as necessary. The information processing apparatus 900 may include a processing circuit such as a DSP (Digital Signal Processor) or ASIC (Application Specific Integrated Circuit), alternatively or in addition to the CPU 901.

The CPU 901 serves as an operation processor and a controller, and controls all or some operations in the information processing apparatus 900 in accordance with various programs recorded in the ROM 903, the RAM 905, the storage device 919 or a removable recording medium 927. The ROM 903 stores programs and operation parameters which are used by the CPU 901. The RAM 905 temporarily stores program which are used in the execution of the CPU 901 and parameters which are appropriately modified in the execution. The CPU 901, ROM 903, and RAM 905 are connected to each other by the host bus 907 configured to include an internal bus such as a CPU bus. In addition, the host bus 907 is connected to the external bus 911 such as a PCI (Peripheral Component Interconnect/Interface) bus via the bridge 909.

The input device 915 is a device which is operated by a user, such as a mouse, a keyboard, a touch panel, buttons, switches and a lever. The input device 915 may be, for example, a remote control unit using infrared light or other radio waves, or may be an external connection device 929 such as a portable phone operable in response to the operation of the information processing apparatus 900. Furthermore, the input device 915 includes an input control circuit which generates an input signal on the basis of the information which is input by a user and outputs the input signal to the CPU 901. By operating the input device 915, a user can input various types of data to the information processing apparatus 900 or issue instructions for causing the information processing apparatus 900 to perform a processing operation.

The output device 917 includes a device capable of visually or audibly notifying the user of acquired information. The output device 917 may include a display device such as an LCD (Liquid Crystal Display), a PDP (Plasma Display Panel), and an organic EL (Electro-Luminescence) display, an audio output device such as a speaker or a headphone, and a peripheral device such as a printer. The output device 917 may output the results obtained from the process of the information processing apparatus 900 in a form of a video such as text or an image, and an audio such as voice or sound.

The storage device 919 is a device for data storage which is configured as an example of a storage unit of the information processing apparatus 900. The storage device 919 includes, for example, a magnetic storage device such as a HDD (Hard Disk Drive), a semiconductor storage device, an optical storage device, or a magneto-optical storage device. The storage device 919 stores programs to be executed by the CPU 901, various data, and data obtained from the outside.

The drive 921 is a reader/writer for the removable recording medium 927 such as a magnetic disk, an optical disk, a magneto-optical disk, or a semiconductor memory, and is embedded in the information processing apparatus 900 or attached externally thereto. The drive 921 reads information recorded in the removable recording medium 927 attached thereto, and outputs the read information to the RAM 905. Further, the drive 921 writes in the removable recording medium 927 attached thereto.

The connection port 923 is a port used to directly connect devices to the information processing apparatus 900. The connection port 923 may include a USB (Universal Serial Bus) port, an IEEE1394 port, and a SCSI (Small Computer System Interface) port. The connection port 923 may further include an RS-232C port, an optical audio terminal, an HDMI (High-Definition Multimedia Interface) port, and so on. The connection of the external connection device 929 to the connection port 923 makes it possible to exchange various data between the information processing apparatus 900 and the external connection device 929.

The communication device 925 is, for example, a communication interface including a communication device or the like for connection to a communication network 931. The communication device 925 may be, for example, a communication card for a wired or wireless LAN (Local Area Network), Bluetooth (registered trademark), WUSB (Wireless USB) or the like. In addition, the communication device 925 may be a router for optical communication, a router for ADSL (Asymmetric Digital Subscriber Line), a modem for various kinds of communications, or the like. The communication device 925 can transmit and receive signals to and from, for example, the Internet or other communication devices based on a predetermined protocol such as TCP/IP. In addition, the communication network 931 connected to the communication device 925 may be a network or the like connected in a wired or wireless manner, and may be, for example, the Internet, a home LAN, infrared communication, radio wave communication, satellite communication, or the like.

The imaging device 933 is a device that generates an image by imaging a real space using an image sensor such as a charge-coupled device (CCD) or a complementary metal-oxide-semiconductor (CMOS) sensor, as well as various members such as one or more lenses for controlling the formation of a subject image on the image sensor, for example. The imaging device 933 may be a device that takes still images, and may also be a device that takes moving images.

The sensor 935 is any of various sensors such as an acceleration sensor, a gyro sensor, a geomagnetic sensor, an optical sensor, or a sound sensor, for example. The sensor 935 acquires information regarding the state of the information processing apparatus 900, such as the orientation of the case of the information processing apparatus 900, as well as information regarding the environment surrounding the information processing apparatus 900, such as the brightness or noise surrounding the information processing apparatus 900, for example. The sensor 935 may also include a Global Positioning System (GPS) sensor that receives GPS signals and measures the latitude, longitude, and altitude of the apparatus.

The foregoing thus illustrates an exemplary hardware configuration of the information processing apparatus 900. Each of the above components may be realized using general-purpose members, but may also be realized in hardware specialized in the function of each component. Such a configuration may also be modified as appropriate according to the technological level at the time of the implementation.

(6. Supplement)

The embodiments of the present disclosure may include, for example, the electronic device and the method for controlling an electronic device which are as described above, and a program for being executed by an electronic device, and a tangible and non-transitory medium having the program recorded therein.

Note that the program may also include not only a program loaded, for example, from the storage onto the memory and executed by the processor but also a program written to an EC or a chipset. When the application function implemented in the electronic device is controlled by a server through a network, the embodiments of the present disclosure may include: the server; and a system including the electronic device and the server.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An electronic device including:
a manipulation unit configured to acquire manipulation by a user; and
a control unit configured to selectively execute one of a plurality of controls of the electronic device which are associated with a duration of the manipulation and to perform switching of at least one of the plurality of controls according to information indicating a state of the electronic device.

(2) The electronic device according to (1), further including:
an output unit configured to output information for the user,
wherein the control unit performs switching on at least one of the plurality of controls according to information indicating a state of the output unit.

(3) The electronic device according to (2),
wherein the plurality of controls include power controls at least one of which is executed when the duration is longer than or equal to a first threshold, and
wherein when the output unit is determined to be not outputting information, the control unit performs switching of the power control.

(4) The electronic device according to (3),
wherein the control unit determines whether or not the output unit is outputting information, based on whether or not the duration is longer than or equal to a second threshold which is larger than the first threshold.

(5) The electronic device according to (4),
wherein when the duration is shorter than the second threshold, the control unit executes one of the power controls which is for shutting down the electronic device, and when the duration is longer than or equal to the second threshold, the control unit executes one of the power controls which is for rebooting the electronic device.

(6) The electronic device according to (3),
wherein the control unit determined whether or not the output unit is outputting information, based on information obtained by monitoring the output unit.

(7) The electronic device according to (6),
wherein when the output unit is outputting information, the control unit executes one of the power controls which is for shutting down the electronic device, and when the output unit is not outputting information, the control unit executes one of the power controls which is for rebooting the electronic device.

(8) The electronic device according to any one of (3) to (7),
wherein when the duration is shorter than the first threshold, the control unit executes one of the power controls which is for causing the electronic device to transition to a power saving state.

(9) The electronic device according to any one of (3) to (8),
wherein the manipulation is pressing manipulation of a power button.

(10) The electronic device according to any one of (1) to (9),
wherein the plurality of controls include command controls of an application function provided by the electronic device, at least one of the command controls being executed when the duration is longer than or equal to a first threshold, and
wherein when the application function is determined to be not operating properly, the control unit performs switching of the command control.

(11) The electronic device according to (10),
wherein the control unit determines whether or not the application function is operating properly, based on a processing state of the application function of the control unit.

(12) The electronic device according to (11),
wherein when the duration is longer than or equal to the first threshold, the control unit executes one of the command controls which is for terminating the application function on condition that the application function of the control unit is not busy, and the control unit executes one of the command controls which is for rebooting the application function on condition that the application function is busy.

(13) The electronic device according to any one of (10) to (12), further including:
a communication unit configured to execute network communication for the application function,
wherein the control unit determines whether or not the application function is operating properly, based on a processing state of the communication unit.

(14) The electronic device according to (13),
wherein when the duration is longer than or equal to the first threshold, the control unit executes one of the command controls which is for terminating the application function on condition that the communication unit is not executing communication for the application function, and the control unit executes one of the command controls which is for rebooting the application function on condition that the communication unit is executing communication for the application function.

(15) The electronic device according to any one of (1) to (14),
wherein the control unit provides a function by which a user makes a selection from control before the switching and control after the switching.

(16) A method for controlling an electronic device, the method including:
acquiring manipulation by a user; and
selectively executing one of a plurality of controls of the electronic device which are associated with a duration of the manipulation and performing switching of at least one of the plurality of controls according to information indicating a state of the electronic device.

(17) A program causing a controller or a processor of an electronic device to implement:
a function of acquiring manipulation by a user; and
a function of selectively executing one of a plurality of controls of the electronic device which are associated with a duration of the manipulation and performing switching of at least one of the plurality of controls according to information indicating a state of the electronic device.

What is claimed is:

1. An electronic device comprising:
circuitry configured to
acquire manipulation by a user,
selectively execute one of a plurality of controls of the electronic device which are associated with a duration of the manipulation and to perform switching of at least one of the plurality of controls according to information indicating a state of the electronic device,
output information for the user,
perform switching on the at least one of the plurality of controls according to the information indicating the state of the electronic device, the plurality of controls including power controls and command controls of an application function provided by the electronic device at least one of which is executed when the duration of the manipulation is longer than or equal to a first threshold,
switch one of the command controls of the application function with another command control in response to determining that the application function is not properly operating.

2. The electronic device according to claim 1,
wherein when the duration of the manipulation is shorter than second threshold, the second threshold being larger than the first threshold, the circuitry executes one of the power controls which is for shutting down the electronic device, and when the duration of the manipulation is longer than or equal to the second threshold, the circuitry executes one of the power controls which is for rebooting the electronic device.

3. The electronic device according to claim 1,
wherein the circuitry is configured to determine whether the information for the user is being output.

4. The electronic device according to claim 3,
wherein when the circuitry determines that the information for the user is being output, the circuitry executes one of the power controls which is for shutting down the electronic device, and when the circuitry determines that the information for the user is not being output, the circuitry executes one of the power controls which is for rebooting the electronic device.

5. The electronic device according to claim 1,
wherein when the duration of the manipulation is shorter than the first threshold, the circuitry executes one of the power controls which is for causing the electronic device to transition to a power saving state.

6. The electronic device according to claim 1,
wherein the manipulation is pressing of a power button.

7. The electronic device according to claim 1,
wherein the circuitry is configured to determine whether the application function is operating properly, based on a processing state of the application function of the circuitry.

8. The electronic device according to claim 7,
wherein when the duration of the manipulation is longer than or equal to the first threshold, the circuitry executes one of the command controls which is for terminating the application function on condition that the application function of the circuitry is not busy, and the circuitry executes one of the command controls which is for rebooting the application function on condition that the application function is busy.

9. The electronic device according to claim 1,
wherein the circuitry is further configured to:
execute network communication for the application function; and
determine whether the application function is operating properly, based on a processing state of the circuitry.

10. The electronic device according to claim 9,
wherein when the duration of the manipulation is longer than or equal to the first threshold, the circuitry executes one of the command controls which is for terminating the application function on condition that the circuitry is not executing communication for the application function, and the circuitry executes one of the command controls which is for rebooting the application function on condition that the circuitry is executing communication for the application function.

11. The electronic device according to claim 1,
wherein the circuitry provides a function by which a user makes a selection from control before the switching and control after the switching.

12. The electronic device according to claim 1, wherein the circuitry is further configured to retrieve and output previously output information to the user in response to the duration of the manipulation being less than the first threshold.

13. The electronic device according to claim 1, wherein the circuitry is further configured to
perform switching of the at least one power control in response to determining that information is not being output to the user, and
determine whether or not the information for the user is being output, based on whether or not the duration of the manipulation is longer than or equal to a second threshold, which is larger than the first threshold.

14. The electronic device according to claim 1, wherein the application function is a web browser provided by the electronic device.

15. The electronic device according to claim 1, wherein the command control of the application becomes a reboot control of the application in response to the duration of the manipulation being longer than a second threshold, the second threshold being larger than the first threshold.

16. A method for controlling an electronic device, the method comprising:
   acquiring, with circuitry, manipulation by a user;
   selectively executing, with the circuitry, one of a plurality of controls of the electronic device which are associated with a duration of the manipulation and performing switching of at least one of the plurality of controls according to information indicating a state of the electronic device;
   outputting, with the circuitry, information for the user;
   performing, with the circuitry, switching on the at least one of the plurality of controls according to the information indicating the state of the electronic device, the plurality of controls including power controls and command controls of an application function provided by the electronic device at least one of which is executed when the duration of the manipulation is longer than or equal to a first threshold; and
   switching one of the command controls of the application function with another command control in response to determining that the application function is not operating properly.

17. A non-transitory computer-readable medium storing computer readable instructions thereon which when executed by a computer cause the computer to perform a method comprising:
   acquiring manipulation by a user;
   selectively executing one of a plurality of controls of the electronic device which are associated with a duration of the manipulation and performing switching of at least one of the plurality of controls according to information indicating a state of the electronic device;
   outputting information for the user;
   performing switching on the at least one of the plurality of controls according to the information indicating the state of the electronic device, the plurality of controls including power controls and command controls of an application function provided by the electronic device at least one of which is executed when the duration of the manipulation is longer than or equal to a first threshold; and
   switching one of the command controls of the application function with another command control in response to determining that the application function is not properly operating.

* * * * *